US011392886B2

United States Patent
Leonard et al.

(10) Patent No.: US 11,392,886 B2
(45) Date of Patent: Jul. 19, 2022

(54) REAL-TIME DETENTION AVOIDANCE SYSTEM

(71) Applicant: Trimble Transportation Enterprise Solutions, Inc., Mayfield Heights, OH (US)

(72) Inventors: Timothy Leonard, Moreland Hills, OH (US); Vasanth Srinivasan, Oklahoma City, OK (US); Joseph M. DeBoth, Chagrin Falls, OH (US); Mark Botticelli, Minnetonka, MN (US)

(73) Assignee: Trimble Transportation Enterprise Solutions, Inc., Mayfield Heights, OH (US)

( * ) Notice: Subject to any disclaimer, the term of this patent is extended or adjusted under 35 U.S.C. 154(b) by 175 days.

(21) Appl. No.: 16/134,194

(22) Filed: Sep. 18, 2018

(65) Prior Publication Data
US 2019/0258999 A1 Aug. 22, 2019

Related U.S. Application Data

(60) Provisional application No. 62/634,087, filed on Feb. 22, 2018.

(51) Int. Cl.
*G06Q 10/08* (2012.01)
*G06Q 10/06* (2012.01)
(Continued)

(52) U.S. Cl.
CPC . *G06Q 10/08355* (2013.01); *G06Q 10/06312* (2013.01); *G06Q 10/0833* (2013.01);
(Continued)

(58) Field of Classification Search
CPC ......... G06Q 10/08355; G06Q 10/0833; G06Q 10/06312; H04L 9/0637; H04L 9/3236;
(Continued)

(56) References Cited

U.S. PATENT DOCUMENTS 7,743,984 B2 6/2010 Olsen et al.
2014/0310041 A1* 10/2014 Crocker ............... G06Q 10/083
705/7.15

(Continued)

FOREIGN PATENT DOCUMENTS

JP 4941273 B2 5/2012

OTHER PUBLICATIONS

Morgan, Terry; "Trucking Loss, Damage, or Delay Claims—#3"; 2015 (Year: 2015).*

(Continued)

*Primary Examiner* — Resha Desai
*Assistant Examiner* — Dione N. Simpson
(74) *Attorney, Agent, or Firm* — Kilpatrick Townsend & Stockton (57) ABSTRACT

A computer system collects and processes data related to a series of shipments from a number of sources (e.g., in the form of a set of event streams formed by grouping and/or processing information from respective sources into information to be processed by the computer system). Some of the information received in the event streams is sufficient to enable the computer system to help carriers/drivers and transportation depots detect conditions that will affect a carrier delivery schedule (involving either pick up or delivery at a loading area of a transportation depot) that will likely result in detention. In a configuration where a driver's schedule is available to the system (as a series of events or as one or more entries on an accessible blockchain) and the transportation depot's relevant information is available to the system (as a series of events or as one or more entries on an accessible blockchain), the system can, in response to transportation depot-side trigger signal and carrier-side trigger signals, perform event mapping/analysis to determine (Continued)

what changes, if any, would avoid or reduce detention issues.

20 Claims, 7 Drawing Sheets

(51) Int. Cl.
*H04L 9/06* (2006.01)
*H04L 9/32* (2006.01)

(52) U.S. Cl.
CPC .......... *H04L 9/0637* (2013.01); *H04L 9/3236* (2013.01); *H04L 2209/38* (2013.01)

(58) Field of Classification Search
CPC .............. H04L 2209/38; H04L 2209/56; H04L 9/3297; H04L 9/3247; H04L 9/3239
USPC ........................................................ 705/338
See application file for complete search history.

(56) References Cited

U.S. PATENT DOCUMENTS

| | | |
|---|---|---|
| 2015/0073853 A1* | 3/2015 | Hariharan ........ G06Q 10/06315 |
| | | 705/7.25 |
| 2015/0154578 A1 | 6/2015 | Aggarwal et al. |
| 2018/0046964 A1* | 2/2018 | Leoni ............... G06Q 10/06315 |
| 2018/0136003 A1* | 5/2018 | Perkins ................ G01C 21/362 |
| 2018/0189528 A1 | 7/2018 | Hanis et al. |
| 2018/0341910 A1* | 11/2018 | Broveleit ............... G06Q 50/28 |

OTHER PUBLICATIONS

Marlowe, Mike; "Poor Planning Undermines Logistics Support and Profitability of CPG Promotions"; Feb. 18, 2010. (Year: 2010).*
U.S. Appl. No. 16/134,216 Non-Final Office Action dated Jun. 23, 2020, 21 pages.

* cited by examiner

REAL-TIME DETENTION AVOIDANCE SYSTEM

CROSS-REFERENCE TO CO-PENDING APPLICATION

The present application claims priority to and incorporates by reference the disclosure of: U.S. Provisional Patent Application No. 62/634,087, filed on Feb. 22, 2018.

FIELD OF INVENTION

The present invention is directed to a real-time detention avoidance system and method, and, in one embodiment, to a blockchain-based system and method for processing information about a transportation depot (e.g., truck warehouse, shipyard, or train terminal) to reduce detention fees associated with transportation vehicles transferring shipments to and/or from the transportation depot.

DISCUSSION OF THE BACKGROUND

Despite being called "shippers," shippers transport goods using a number of different kinds of "shipping mechanisms," including, but not limited to automotive vehicles (e.g., trucks, cars, and vans), trains, and ships. Often shippers contract with one or more carriers to handle the delivery of the goods from the contract origin to the contract destination. Those "carriers" themselves may either transport the goods between the contract origin and the contract destination or the "carriers" may act more as carrier/brokers (or consolidators) that subcontract part of the transportation to others, or just brokers (or consolidators) that subcontract all of the transportation to others.

Known shipping arrangements include clauses that trigger payments by the shipper to the carrier based on delivery of the goods to the contract destination. Payments to the carrier in turn may trigger payments to subcontractors and/or to drivers. However, such payment triggers provide a financial incentive to those handling the end delivery (e.g., the drivers) to indicate delivery of goods as early as possible—potentially before the goods have even been delivered.

Similarly, some goods being transported may be considered so "mission critical" or time sensitive (e.g., needed by a particular time and date as part of a just-in-time production facility) that the recipient of the goods may not be able to rely on (1) outdated delivery information from the shipper or (2) delivery information that is too coarse-grained to enable real-time or just-in-time delivery decisions. Accordingly, there is a need for a real-time, independently verifiable location tracking information and for a system and method for generating and processing the same.

However, another common issue dealt with in the shipping industry is detention, i.e., the mis-scheduling of a delivery vehicle that causes a delay in the utilization of the delivery vehicle (or the loading/unloading facility). For example, a driver may have arrived at a location for pickup or delivery but is unable to immediately pick up or deliver due to: (1) a lack of loading area (e.g., loading dock or loading port) availability (e.g., a previous delivery has not finished picking up or loading, or a staging area has not been cleared of a previous delivery so there is no staging room to which the current load can be unloaded), (2) a lack of loading area support staff (e.g., the loading area is available but the staff to load or unload are currently at lunch or on break and will not return for a known period of time), (3) a lack of loading area assets (e.g., a forklift or crane needed to handle the loading or unloading is unavailable because it is being used by another loading area), and (4) an improperly staged delivery (e.g., not all of the load that is to be loaded onto the truck has been moved from an internal area (e.g., shelving or container stacked area) of the transportation depot (e.g., trucking, shipping or train warehouse or port) to the loading area). Each of those situations can result in "detention" of the delivery vehicle such that the carrier/driver is entitled to compensation for the resulting delay that often cascades into the carrier/driver missing a future delivery opportunity as a result. Accordingly, there is a need for a real-time detention avoidance system and method for generating and processing detention information (e.g., for triggering smart contract penalty clauses).

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
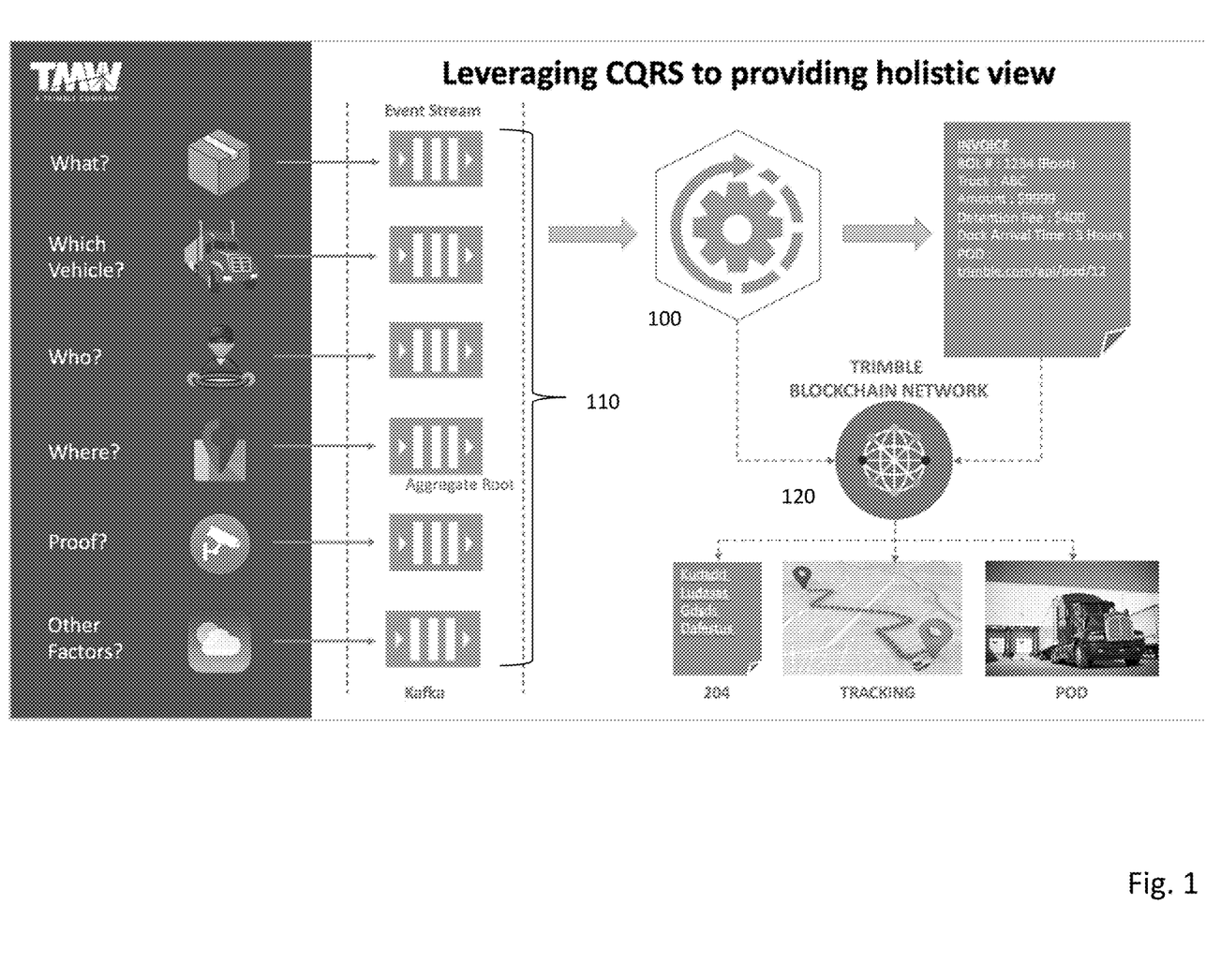
FIG. 1 is a data transfer diagram showing how data related to a series of shipments is collected from a number of sources into a number of event streams, consolidated, used to generate reports/invoices relating to the shipments, and placed into a blockchain network for access by a number of participants in the shipping process.

Turning to FIG. 1, a data transfer diagram illustrates collecting and processing data related to a series of shipments from a number of sources. At least one computer system 100 receives a set of event streams 110 formed by grouping and/or processing information from respective sources into information to be processed by the computer system 100. In one embodiment, a message queue (e.g., as implemented by the "Apache Kafka platform") handles the creation of the event stream to be used by the system 100. In general, event streams can be formed by packaging the raw information into one or more packets that are transferred to a desired location (e.g., using an encrypted or unencrypted communications stream, such as a IPSec session or a TCP/IP connection, respectively). The computer system 100 receives the event streams 110 and performs a number of operations on the event streams (and optionally also on internally generated data or on data from data sources not shown).

In one exemplary embodiment, some of the information received in the event streams 110 is sufficient to enable the computer system 100 to track and invoice shipments. As shown in FIG. 1, the information received from the event streams 110 enable the system 100 to prepare an invoice (e.g., with a bill of lading, a truck identifier, a value of the shipment (identified as it "value"), a detention fee, a dock arrival time, and a POD (Proof of Delivery) identifier. The system further may process and/or generate EDI (Electronic Data Interchange) 204 forms (Motor Carrier Load Tender forms), as shown in FIG. 1 (with arbitrary text representing the load information for an exemplary EDI 204 form).

An exemplary computer system 100 may also be able to store on a blockchain network 120 and/or read from a blockchain network 120 information related to the event streams and/or the information generated within the computer system 100 (e.g., the invoices). In such a configuration, third-parties may be able to utilize the blockchain information to determine information about relevant shipments (e.g., tracking information, proof of delivery information and even delivery exception information).

Figure 2:
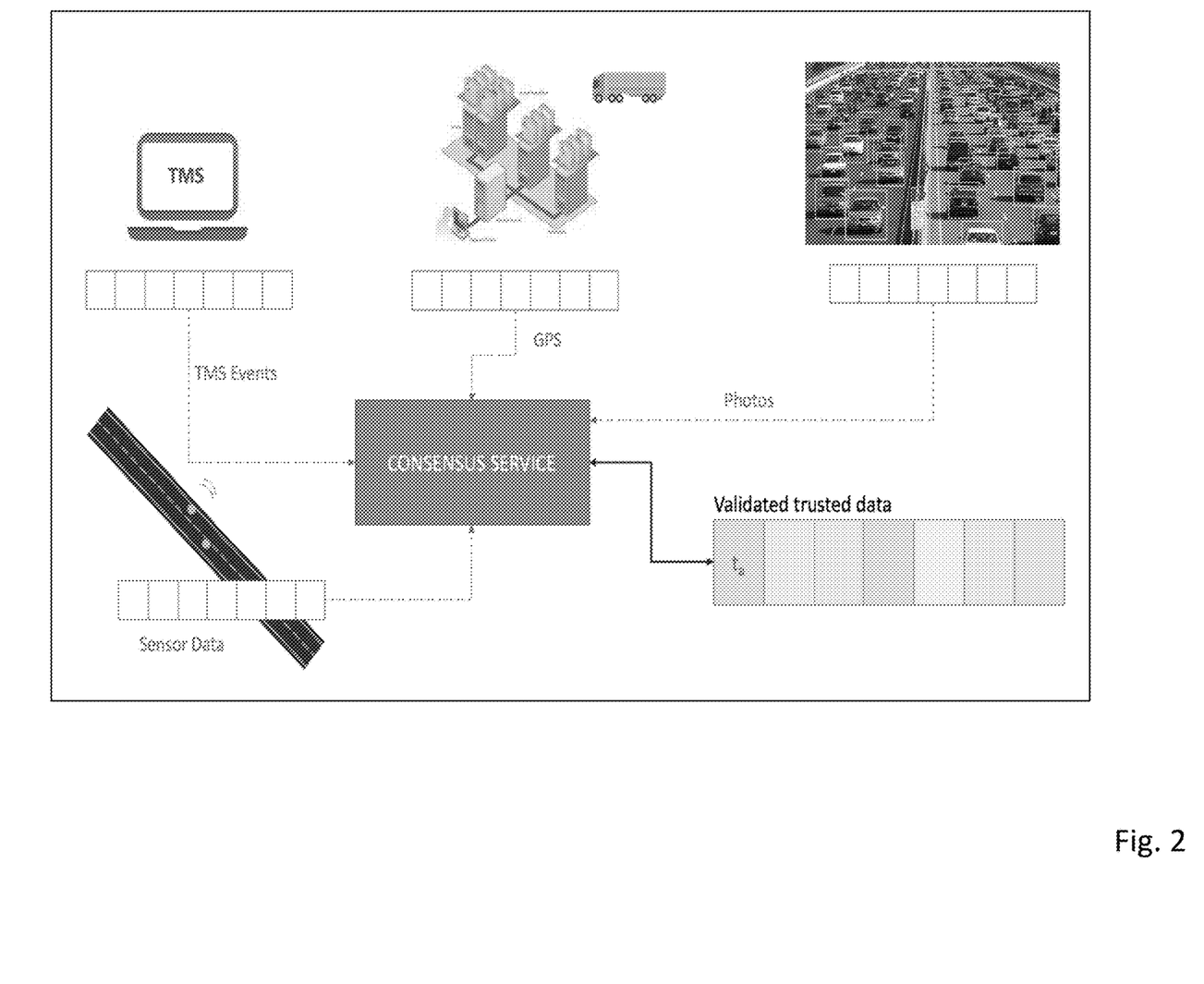
FIG. 2 is a data transfer diagram showing additional details on a number of exemplary data sources of FIG. 1.

As shown in greater detail in FIG. 2, a number of sources of data can be combined by a consensus service of the computer system 100 to determine a consensus as to where a vehicle making a delivery is currently located so the delivery can be tracked. By utilizing third-party verifiable information, shippers and receivers can have greater confidence when making shipment related decisions (e.g., just-in-time manufacturing decisions and payment decisions after a shipment has allegedly been delivered). As shown in FIG. 2, exemplary information that can be utilized to form a consensus includes, but is not limited to, driver-specified events (labeled TMS (Transportation Management System) Events) such as the changing of the status of a package to be delivered, self-reported data (such as GPS data relating to a vehicle's self-advertised location and/or video data from at least one on-board camera), and third-party sensor data (e.g., from road-side sensors and photo data (e.g., from toll cameras and/or security camera)). Such information can be combined and given a trust score (or consensus score) based on how much information corroborates the location of a vehicle (potentially storing the raw data and/or the consensus on a multi-party blockchain. (Access to the information on the blockchain that is delivery-related may be limited to the delivery contract participants, such as the shipper, the receiver, and the carrier including its subcontractors).

Figure 3:
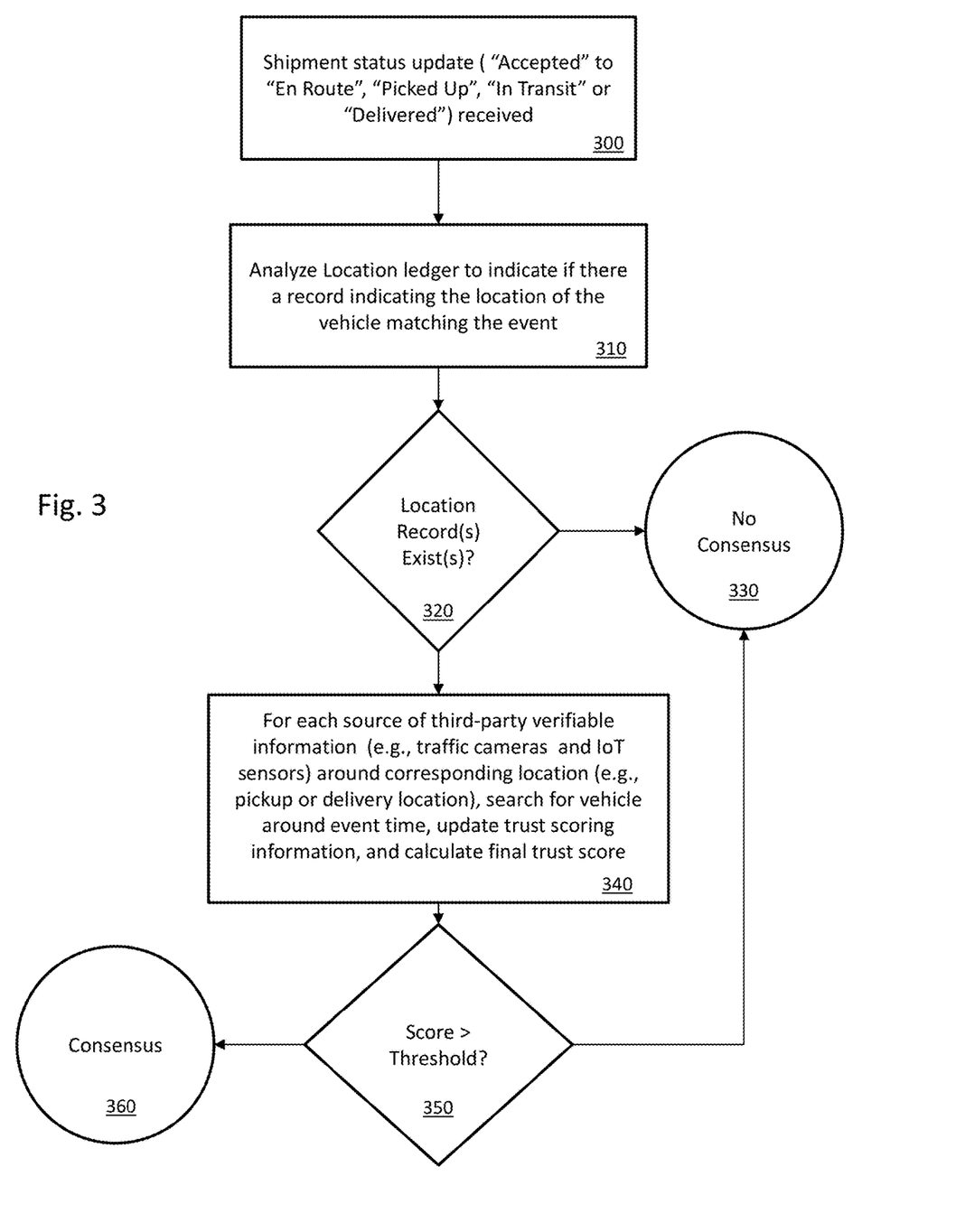
FIG. 3 is a flowchart showing an exemplary implementation of a trust scoring method that updates and tracks a trust score based on a vehicle-based trigger signal to determine if there is a consensus as to the location of a particular tracked vehicle.

As shown in FIG. 3, an exemplary process of generating a trust score and/or a consensus for vehicle location information can be represented by a flowchart. An exemplary trust score updating process begins in step 300 when the computer system 100 receives a "trigger signal" from a carrier (or from a vehicle directly) that a shipment/delivery status has changed. For example, the computer system 100 can receive a "shipment status update" that (1) a carrier has "accepted" a contract to deliver a package, (2) that the carrier is "en route" to pick up the package, (3) that the package has been "picked up", (4) that the package is "in transit" to the delivery location, and (5) that the package has been "delivered". That computer system 100 may, on a per-delivery basis store such statuses as strings (such as "Accepted," "En Route," "Picked Up," "In Transit," or "Delivered") or as other identifiers that internally represent those statuses (e.g., as integer which each represent a separate status). (As would be appreciated by those of skill in the art, other shipment status updates are also possible, such as delivery exception status updates (e.g., delivery location closed or equipment breakdown).) Each of those shipment status updates are "vehicle-based trigger signals" as they relate to a vehicle initiating a corroboration of a status change, even if the status change is routed from the vehicle to the carrier and then from the carrier to the computer system 100.

Moreover, the above shipment status updates are considered to be "client-facing shipment status updates" because they relate to status updates that affect the customer without specifying some of the internal details that may be available to the carrier and/or driver. For example, "en route" and "in transit" both encompass several finer grain details that are important to the carrier/driver. For example, a driver may have arrived at a location for pickup or delivery but is unable to immediately pick up or deliver as described above with respect to the Discussion of the Background. Each of those situations can result in "detention" of the delivery vehicle such that the carrier/driver is entitled to compensation for the resulting delay that often cascades into the carrier/driver missing a future delivery opportunity as a result. Accordingly, the system 100 can further be configured to respond to trigger signals that are "carrier-facing shipment status updates" and to capture and corroborate such updates. Such carrier-facing shipment status updates can include, but are not limited to, updates corresponding to each of the factors described above that indicate why immediate delivery/pick is unavailable (e.g., "at pickup transportation depot but loading area occupied," "at delivery transportation depot but loading area personnel unavailable," or "at pickup transportation depot but loading area asset unavailable"). A system may utilize even more fine grain codes to provide additional detail (e.g., "at shipyard transfer station for trailer load pickup but trailer load stacked beneath other trailer loads," "at railroad transfer station for trailer load pickup but trailer load still on train"). As described in further detail below, video information from other trucks and/or the transportation depot can corroborate such a status to support a carrier's/driver's claim of detention later.

In response to the computer system 100 receiving the trigger signal with an updated status, the computer system 100 determines in step 310 if there is location information available that corresponds to the change. For example, the computer system 100 may analyze either an event stream or event ledger to determine if the system 100 can find a location that corresponds to where the status change allegedly happened. Such information may be stored in a GPS event stream that is created by the carriers self-reporting their vehicles' locations or on a GPS blockchain ledger generated from carriers self-reporting their vehicles' locations. In one embodiment of the GPS systems described herein, the GPS system is a self-contained GPS unit that cryptographically signs or hashes at least a portion of the GPS data to avoid altering or misreporting the GPS information. For example, such a GPS unit would output not only a GPS position (and optionally the time at which the GPS position was taken) that acts as a message to be signed but also outputs a cryptographic signature of the message (GPS position and/or time) such that the GPS location cannot be faked. Third-party's can use known techniques (e.g., public key cryptography) to authenticate the message. Alternatively, the message could be hashed by the GPS unit along with an internally hidden random number and a time-varying value to produce a hash for the GPS message that could be verified by a verification site that knows the random number used by the GPS unit. In yet another embodiment, specialized GPS receivers using watermarked GPS satellite data can be used to prevent assertions of fraudulent GPS locations. (See Scott, L., "*Proving Location Using GPS Location Signatures: Why it is Needed and A Way to Do It,*" *Proceedings of the* 26*th International Technical Meeting of The Satellite Division of the Institute of Navigation* (*ION GNSS*+2013), Nashville, Tenn., September 2013, pp. 2880-2892.) In addition, where GPS information is not available, video information (e.g., a picture substantially matching a picture of a known location) can be used to determine a location corresponding to the status change.

Alternatively, for some status changes, a location for the status change can be inferred based on how the status changes. For example, when a status changes from "en route" to "picked up", the system can infer that the location of the action was at the origination location agreed upon in the contract. Similarly, when a status changes to delivered, the system can infer that the location of the action was at the delivery location agreed upon in the contract.

In step 320, the system determines if location information was found in step 310 (e.g., GPS-based, video-based or implicit location-based information). If step 320 determines that there is no location information available for the status change, then the computer system 100 passes control to step 330 and the computer system determines that there is no consensus as to the location of the corresponding event. That information can be made available to contract participants, either directly (e.g., via email) or via a shared resource (e.g., a web site or a blockchain).

If step 320 determines, however, that a location record does exist, the control is passed to step 340 in which the system 100 determines if there is additional, third-party verified information that corroborates the status change reported by the carrier. Not all locations will have third-party verified information that corroborates the status change reported by the carrier. For example, a pickup at a rural location from the front porch of a home with no one inside is unlikely to have any third-party verified information that corroborates the status change reported by the carrier.

To determine if there is third-party verified information in the vicinity of the location corresponding to the status change reported by the carrier, the system 100 may include a database of other sources of third-party verified information. The system 100 would query the database using the location information that is to be corroborated as a search parameter and optionally a maximum distance. For example, the system may search the database for information sources within a two block radius of the specified location (e.g., specified by GPS location or address) if the location is in a high density data source area, within a one mile radius in an urban setting, and within a 5 mile radius if the location is in a rural setting. Alternatively, the vehicle may provide the system 100 with "hints" about known third-party data sources that are known to the vehicle to be close to the specified location in order to supplement the information that the system has in its database (or to reduce query times by the system against the database). In one embodiment, for each information source found, the system can (iteratively or in parallel) query whether the information source has any information (or events) that corresponds to the status change being corroborated.

As an example of the verification performed in step 340, after a delivery has been "Accepted" by a carrier, the carrier dispatches a subcontractor to retrieve a package and notifies the system 100 that the status of the delivery should be updated to "en route." Preferably, the carrier includes (either directly or via an interface with the subcontractor) information sufficient to identify the vehicle associated with the "en route" pick-up. Such information may include license plate information, make and model of the vehicle, and any on-board tracking information that is available (e.g., the unique ID of a GPS-tracker associated with the vehicle, or the unique ID of the toll transponder of the vehicle, if available). The carrier also provides location information (e.g., from a GPS or via street address) of where the vehicle currently is (e.g., at another delivery or pick up location). The system 100 receives the location information corresponding to the alleged location and queries the database for relevant information sources within a corresponding radius. In one such embodiment, the system 100 waits a sufficiently long period of time after the alleged status change to allow the sensors to sense their respective information, process it and store it so that it is available for retrieval. How long a period that is may be sensor dependent (e.g., it may take longer for video information to become available than simpler (and less data intensive) Radio Frequency Identification (RFID) information). In some embodiments, the system 100 may have to query a source more than once if data from the source is not yet available for the vehicle being tracked. As a result, some final consensus scores may be delayed in being calculated, and the system may utilize one or more "timeouts" for when it dynamically removes sensors from the list of possible sensors that could corroborate a vehicle's location.

Figure 5:
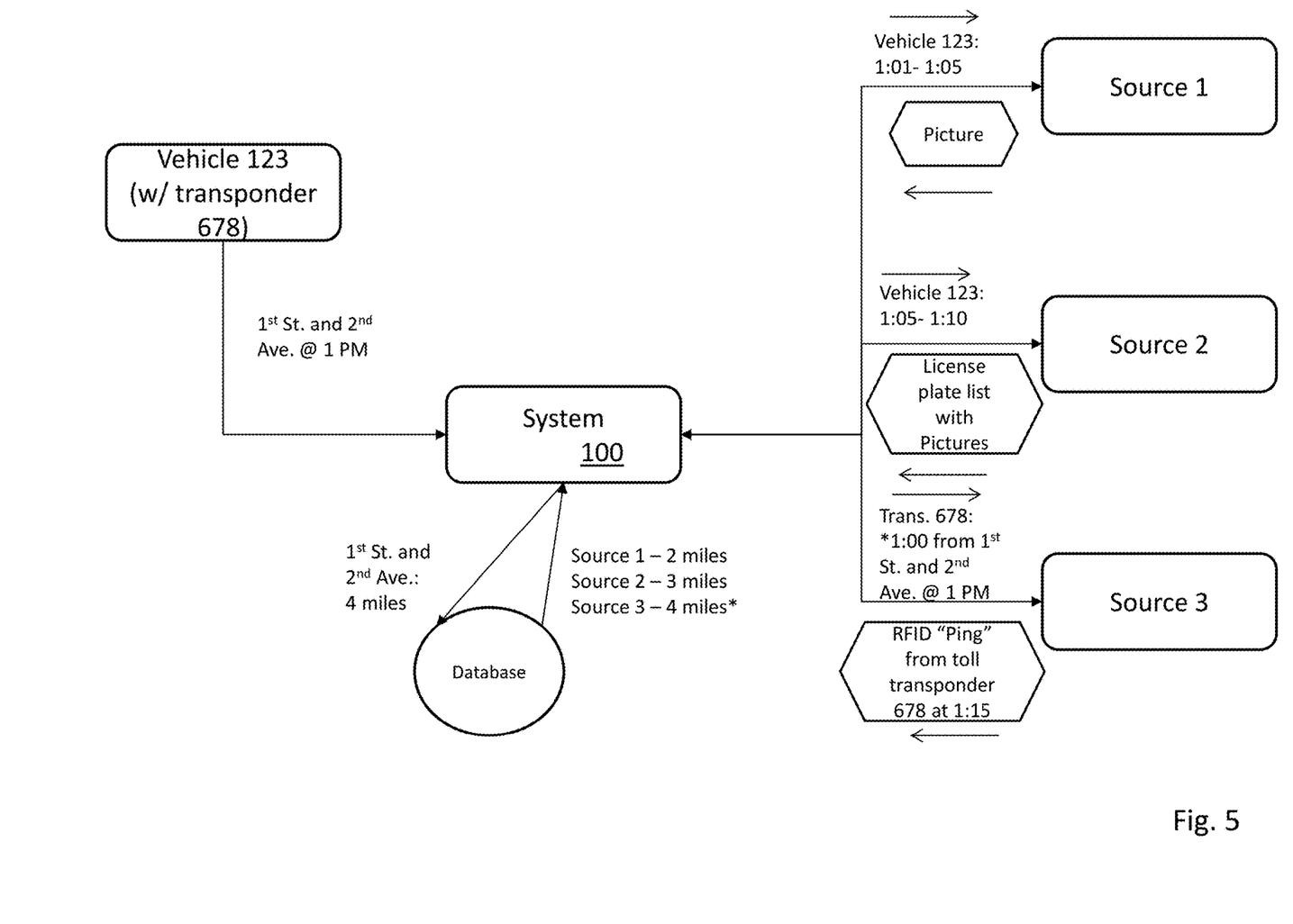
FIG. 5 is a dataflow diagram showing exemplary messages that can be sent from an exemplary system described herein to various networked sensors to read third-party verifiable data (although the same data could be read from corresponding multi-party blockchains)

In one example, as shown in FIG. 5, the location is in the downtown of a medium sized city, so the system queries a four-mile radius from the specified location (e.g., $1^{st}$ Street and $2^{nd}$ Avenue or GPS coordinates x & y) for information around the time of the status change (e.g., within some number of minutes of the time of the status change). The system may vary the length of time to use as the search window around the status change depending on the expected travel speeds of the vehicle and/or the distance from the alleged location of the vehicle and the location of the third-party information source. For example, shortly after a status change at 1 PM (e.g., at 1:10), source 1 may be queried for picture information (preferably with an embedded timestamp) for all passing vehicles between the times of 1:01 and 1:05 for a source that the database tells the system 100 is 2 miles from the status change (in the hopes of finding vehicle 123). Similarly, at 1:18, source 2 may be queried for a license plate list (preferably with an embedded timestamp) for vehicle 123 between the times of 1:05 and 1:10 for a source that the database tells the system 100 is 3 miles from the status change (having allowed extra time for sensor 2 to perform the image processing itself). Alternatively, the system may provide the third-party information source with a time and location corresponding to the trigger signal, and the third-party information source then is responsible for determining an appropriate time window itself (e.g., by source 3 looking for a corresponding transponder signal 678 and returning any matches in the timeframe that source 3 determined is relevant). In such a case, even though source 3 is farther away than sources 1 and 2, source 3 could be notified immediately after the status change (e.g., at 1:01) so that it has time to begin whatever scheduling it needs to do to be ready to capture and process the information. By providing advance notice to a source, the source may have time to marshal additional processing and/or storage resources that it might need to accommodate all of the requests that are being made of it. Similarly, if a small number of requests are being made of the system, the system may be able to dynamically shed processing and/or storage resources that are presently unneeded.

In the context of traffic cameras in the area that have shareable pictures from the relevant time, the system 100 can request (as with sensor 1 in FIG. 5) from each of the cameras cryptographically signed copies of the photos in the relevant (fixed, speed varying or distance varying) time period and can either process the license plates (i.e., perform optical character recognition (OCR) on the license plates) in the photos itself or transmit the photos to a third-party to perform the image processing. In an alternate embodiment, the system requests (as with sensor 2 of FIG. 5) that the traffic camera control system perform the image processing and provide a cryptographically signed list of licenses plates (which the system may then request the corroborating photo of if the system determines that the vehicle license plate is in one of the photos).

In addition to traffic cameras, another source of video information is one or more cameras mounted on or inside a vehicle (including one or more cameras mounted on or inside the vehicle being tracked). For example, a camera inside the driver compartment of Vehicle A that is pointing out towards the road may periodically (or at known GPS locations) take a picture of the area around Vehicle A such that geographically-identifiable landmarks can be recorded that corroborate Vehicle A's location. In one such configuration, pictures can be taken of (1) exit signs along a highway route, (2) signs indicating that the vehicle is entering a particular city or county, and/or (3) mile markers. In addition, pictures can be captured and stored of other vehicles (e.g., showing the license plate of Vehicle B) that is in front of Vehicle A (either going the same way or in the opposite direction). If Vehicle B's location also is being tracked by the system 100, then more than one tracked vehicle would be reporting similar locations simultaneously, and the system 100 would have increased confidence that the location information (e.g., GPS location information) being sent about the location of Vehicle A is reliable. (The same kind of information can be obtained from a rear facing camera as well.) Furthermore, the process can be used in reverse by having Vehicle A's location information be updated within the system 100 using video information (e.g., license plate information) from Vehicle C that is behind Vehicle A or passing Vehicle A in the opposite direction. The collection and processing of the video information on other vehicles can be provided as a service to third-parties that do not have in-vehicle systems or that are tracked by third-parties (i.e., are tracked by systems other than by system 100).

The video information captured from other vehicles' in-cabin cameras or exterior cameras also can be used to corroborate carrier-facing shipment status updates. A camera from a truck currently backed into in a loading area may be used to corroborate that another truck was waiting for the use of that loading area (either because the camera shows the waiting truck or because the background of the captured image shows that the truck at the loading area must have been at the loading area). (In addition, the GPS information of the truck at the loading area can further be used to corroborate the location of the truck at the loading area (and consequently that the loading area was occupied).)

Other video capture devices also are possible, such as security cameras (e.g., at transportation depot entrances/exits, and loading area) of transportation depots at which deliveries are to be picked up and/or dropped off, local homes or stores that are participating in the corroboration process, video cameras at distribution centers, and video cameras at toll booths. Additional corroborating "video" information may include information (e.g., the Media Access Control (MAC) address) about the device that captured the video which can be cross-checked against public information about that device.) Having received an indication of how many photos, if any, corroborate the location of the vehicle, the system 100 updates the information related to the delivery.

Similarly, when the system queries the database for information sources within a four-mile radius from $1^{st}$ Street and $2^{nd}$ Avenue, the system also may find that there are a number of toll booth receivers in the area that can be queried to see if the toll transponder of the vehicle also indicates that the vehicle was near the designated area (as shown with respect to source 3 in FIG. 5). Other RF-based systems similarly can be used, such as a WiFi transceiver in a known location having momentarily connected to a WiFi hotspot on the vehicle (or the other way around). Internet of Things (IoT) sensors on the streets and/or highways can similarly be used to provide location information. Similarly, a number of utility companies (e.g., gas, water and electric companies) have special-purpose networks for tracking the usage of the corresponding utilities. In some embodiments, the system may receive (1) data collected from those utilities using the utility companies' sensors or (2) data collected from other sources (e.g., information collected on-board the vehicle) but forwarded to the system using the communications networks used by the utilities (i.e., piggybacking transmission of the data on the utilities' networks).

In another example, a driver changes a status of a shipment from "en route" to "picked up." As discussed above, the system does not need GPS location information from the truck or a GPS sensor to know the location of the driver at that point in time—the driver is at the location specified for the shipment pick up. In addition to the consensus information discussed above, other verifiable information relating to the pick-up (or drop-off) location can be utilized (e.g., still shots or live video from video cameras in the pick-up location, the signature of a receptionist or loading area employee, or information from an RFID tag around the driver's neck that is read by an RFID reader at the pick up location or a Bluetooth compatible device that connects to a Bluetooth device carried by the driver (e.g., in its barcode reader or telephone) while at the pick up location. As would be appreciated by those of skill in the art, the verifiable information discussed above can be read in response to the vehicle-based trigger signal or could be used as sensor-based triggers. Additionally, other location-specific information gathered by the driver at a location could be used to supplement the vehicle-based trigger, such as an RFID signal at the location that is read by an RFID reader in the driver's barcode scanner, a Bluetooth signal at the location that is read by a Bluetooth reader in the driver's barcode scanner or phone, a time varying barcode that is read by the driver's barcode scanner, and a short-range geotag (e.g., a time-varying cryptographic-based token) transmitted at the origin that is automatically added by a SnapChat-like filter to a picture of the package and/or the driver.

In each of the above configurations, the information that is utilized to help corroborate a vehicle location can either be received in a raw form, as part of an event stream from an authenticated information source, or from a distributed multi-party blockchain ledger. The corroborating information may be data that is, for example, streamed continuously (live), available upon request, recorded in a blockchain ledger or that is requested by the system 100 to be sensed or recorded by available equipment. In each embodiment, the system 100 may write the data to one or more multi-party distributed blockchain ledgers to provide a permanent, cryptographically signed and verifiable record of the data that was used as part of a consensus calculation.

Figure 4:
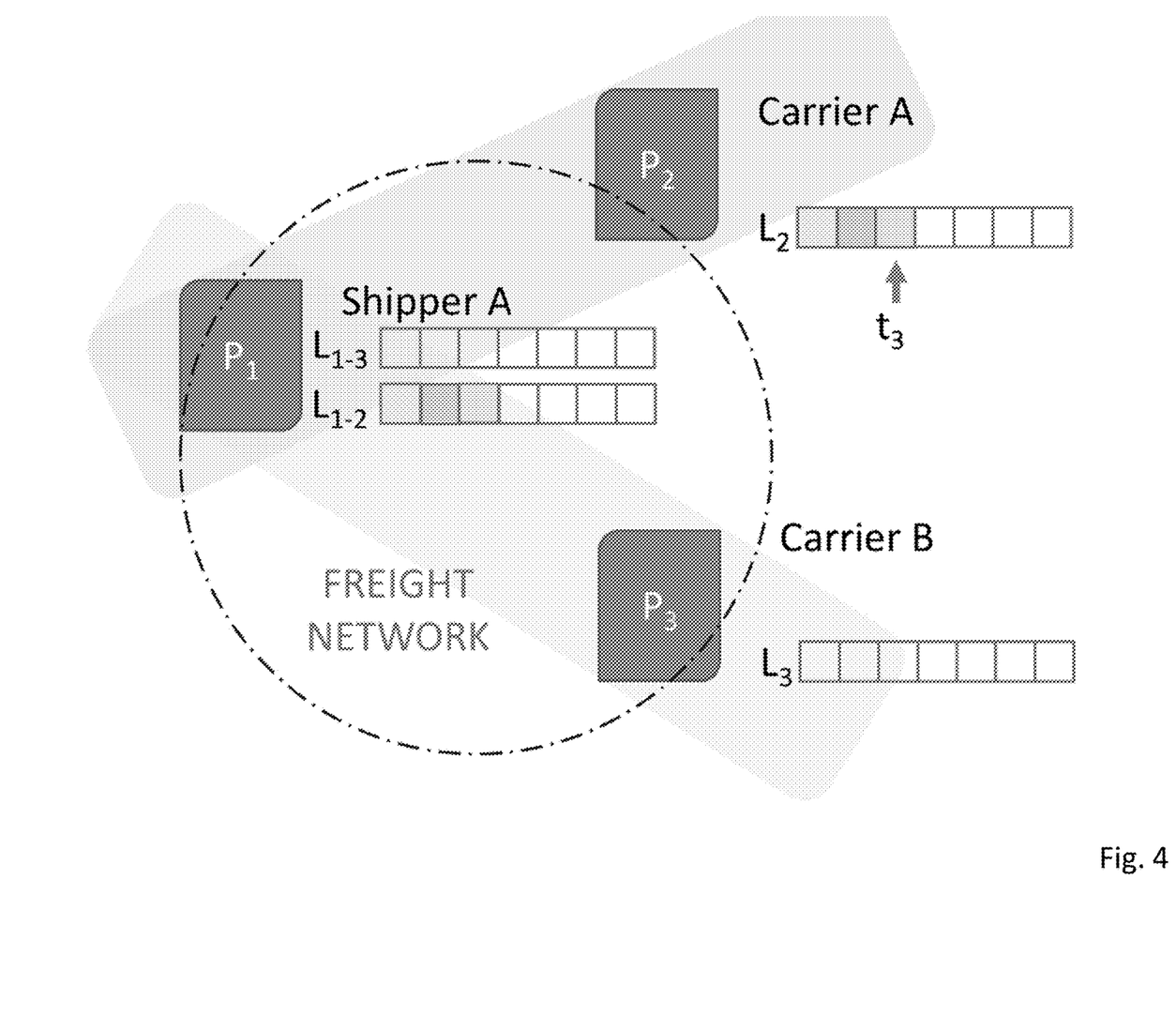
FIG. 4 is data sharing diagram showing a shipper (Shipper A), two carriers (Carrier A and Carrier B), and the information about the deliveries in the respective shipping "lanes" between them.

However, in many instances, not all data should be shared publicly. As shown in FIG. 4, a shipper (labeled "Shipper A") may have shipping contracts with multiple carriers (e.g., "Carrier A" and "Carrier B"), and the shipper and carriers may share information about the deliveries in the respective shipping "lanes" between them (but only with the corresponding party). FIG. 4 conceptually shows the information about three shipments in the lane ($L_{1-2}$) between Shipper A and Carrier A at a fixed point in time ($t_3$) that is shared between Shipper A and Carrier A but isolated from Carrier B. Such a configuration would prevent Carrier B from knowing the location of vehicles of Carrier A (e.g., that may be transporting valuable packages or controlled substances that are prone to theft).

A portion of the above-discussion focused on the corroboration being triggered by the change in a delivery status (e.g., from "en route" to "picked up"). However, as would be appreciated by those of skill in the art, the process could also happen from time-to-time (e.g., a trigger signal is sent periodically to the system with the vehicle's current location), when the vehicle stops, or at known locations during the vehicle's travels. For example, after a vehicle has picked up a package for a first delivery, the vehicle may stop at a different location to make a pick-up for a second delivery. During the pick-up for second delivery, although the system is not making a status update corresponding to the first delivery, the system could nonetheless use the opportunity to update location information for the first delivery. (The status change in the second delivery would act as a trigger signal to the system 100 for both the first and second deliveries.)

Similarly, a vehicle could send a trigger signal to the system by updating the vehicle's status to "near location X" when it nears a location with known third-party verifiable data sources so that the system can perform automatic corroboration, increasing the trust score of a shipment. The driver may be made aware of such locations based on the visual clues on the screen of a navigation program thereby encouraging the driver to take a more verifiable route.

In an automated navigation system containing information on the location of known third-party verifiable data sources, the driver may be directed away from a shortest distance route to a route that is known to contain third-party information tracking devices that can corroborate the location of the vehicle. Since traffic cameras most often are installed in urban locations, this automated navigation is preferably utilized when the vehicle passes through a city or when the final destination is in an urban location. By breaking the route into multiple segments in such a way that each segment covers an urban area, the vehicle could be rerouted to obtain more coverage when the out of original route distance is less than a configurable percentage of the overall distance for that particular segment.

In one configuration, the system may provide configurable weightings to the vehicle's route management software such that the presence of sensors is taken into consideration just like other factors (e.g., differing speed limits on similar length routes or differing probabilities of congestion on similar length routes). In such a configuration, the system may treat a route with a corroborating sensor as "better" (e.g., similar to a route with higher speed limit or less likely to be congested) when routing the vehicle. As a result, the vehicle is more likely to pass a corroborating sensor. One such configuration may also factor in the amount of time since the last corroborating sensor and whether or not the vehicle is equipped with on-board video that can act as corroboration. For example, a truck without corroborating video that has not been past a corroborating sensor in a threshold period of time (e.g., 30-45 minutes) may be routed on a route that is 1 minute slower than the optimal route but would not be routed on a route that was 10 minutes slower for the same period of time since corroborating evidence was obtained. However, a vehicle with on-board video need not be routed over the 1 minute slower route as it already has corroborating evidence, even if it is not from a third-party.

Figure 6:
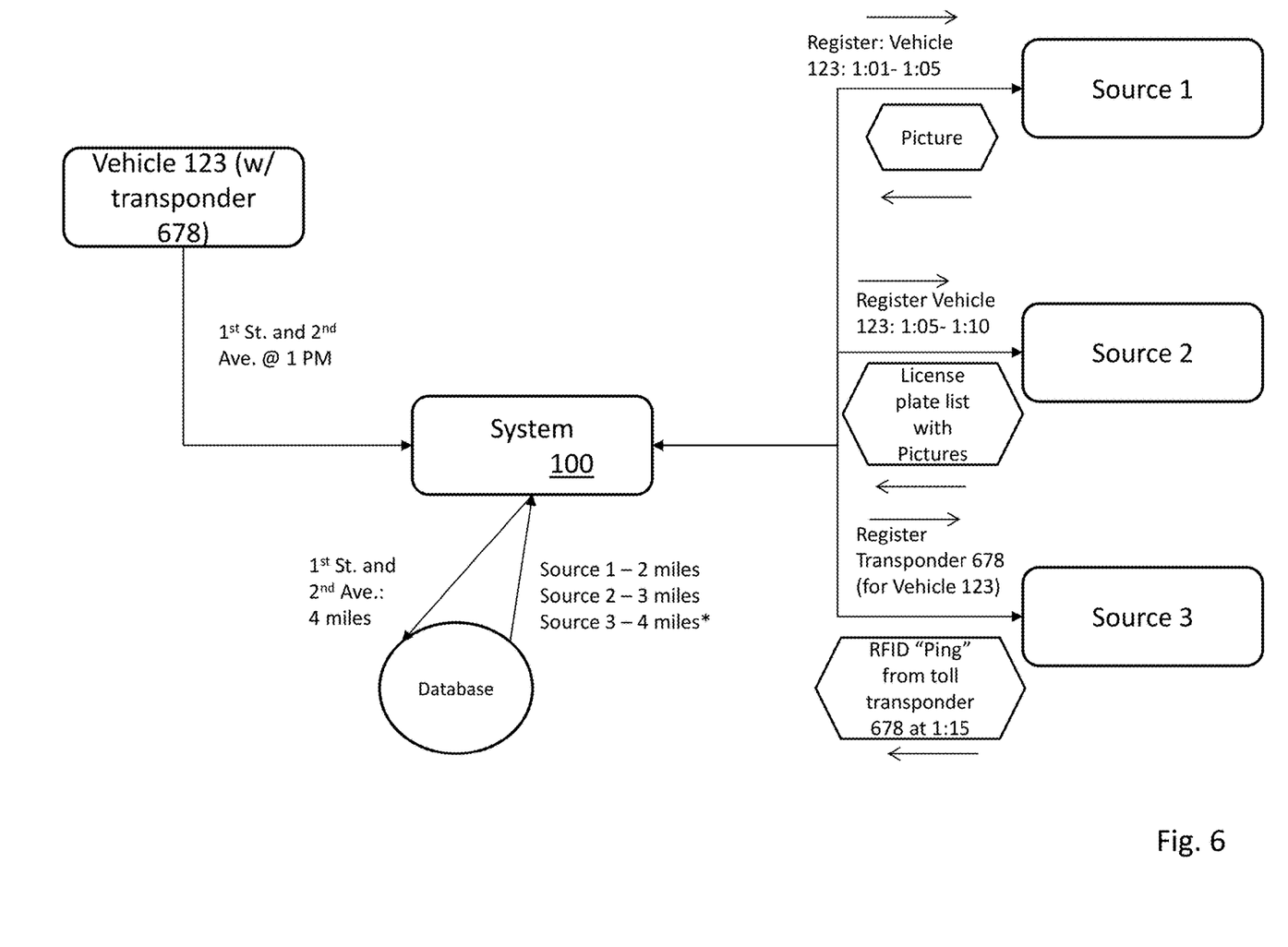
FIG. 6 is a dataflow diagram showing exemplary messages that can be sent from an exemplary system described herein to various networked sensors to request that the sources attempt to create third-party verifiable data that can be returned for processing by the system if/when available (although the same data could be written to corresponding multi-party blockchains for later retrieval by the system)
Figure 7:
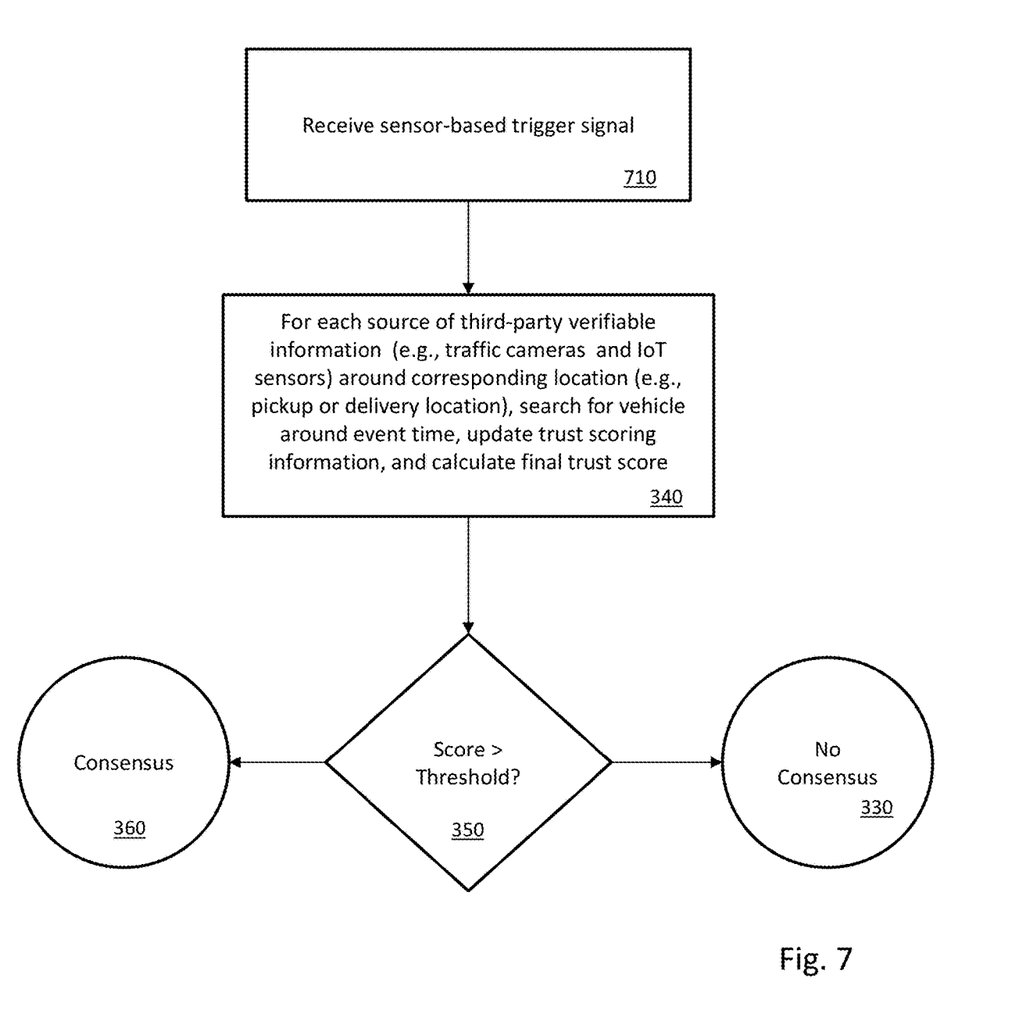
FIG. 7 is a flowchart showing an exemplary implementation of a trust scoring method that updates and tracks a trust score based on a sensor-based trigger signal to determine if there is a consensus as to the location of a particular tracked vehicle.

A portion of the above discussion has focused on requesting information from information systems that are expecting to be continuously gathering and storing information (e.g., toll both cameras), but the system also can be used to trigger data captures for devices that may not always be recording (or storing the recordings). For example, camera captures could be triggered based on the detection of a WiFi MAC address of a device on a delivery vehicle coming into range at a location and/or the RFID or barcode on a package passing a sensor. Alternatively, the camera captures could be triggered based on the vehicle or the system transmitting to a known sensor that the navigation system predicts that the vehicle will pass by the sensor at a particular time. As shown in FIG. 6, the trigger signal that is used to update the corroborating information need not be generated by the vehicle or the system 100. Instead, by the system 100 registering what information it is looking for with each of the corresponding sensors, the sensors themselves can utilize "sensor-based trigger signals" sent to the system 100 so that the corroborated location of the vehicle can be updated as shown in FIG. 7. The sensor-based trigger signals can include the data itself or can simply include an indication that the data is available and can be queried or read by the system 100 (e.g., from a multi-party blockchain having the sensor's data stored thereon). When triggering or requesting a data capture, the system can request the data capture for a particular time or time period (e.g., in three minutes).

As described herein, the system 100 collects, stores and publishes information about the location of vehicles involved in a shipment and/or delivery on at least one distributed blockchain ledger. Each of the above types of corroborating evidence can be used as part of the consensus score. Consensus can be achieved using relative consensus, absolute consensus, and hybrid consensus. In relative consensus, the system determines that there is a consensus among data sources if a threshold percentage of the sensors in a particular area indicate that the vehicle was where it claimed to be. For example, a vehicle is passing a known location that has video cameras, toll booths, and a WiFi or Bluetooth hotspot. Because of the speed of passing vehicle or interference or congestion, the WiFi or Bluetooth hotspot does not corroborate the location of the vehicle's self-reported GPS location, but both the video camera and the toll booth corroborate the location. The vehicle would have a 66% confirmation rate (two confirmation methods out of three), and if the threshold was 60%, then the system would determine that the vehicle's self-reported GPS location is confirmed. If the vehicle likewise has an on-board camera that has recently obtained corroborating video, then the vehicle would have a 75% confirmation rate (three confirmation methods out of four), and the system would again have a consensus.

Alternatively, the system can use an absolute consensus scoring system. For example, if the vehicle's self-reported GPS location is corroborated by at least 2 other sensors (including cameras), even if there were 10 other sensors, that may be sufficient to be above an absolute threshold. Such a configuration may be appropriate where the sensors in an area cannot keep up with the reporting load being requested. A hybrid consensus can also be utilized (e.g., an absolute threshold of three unless there are at most three sensors in an area and then a relative threshold of 50%). The system also can be configured to use various thresholds depending on location (e.g., requiring higher thresholds in urban areas and smaller thresholds in rural areas). The system further can be configured to filter out extraneous data or automatically void any potential consensus in the presence of contradictory data (e.g., (a) a device is reporting a location that would cause it to be at a location that appears unreasonable given (1) the time since the last corroborated location was reported and (2) the speed limits in between those locations, and (b) a device is reporting location more than 100 miles from where a sensor is reporting the vehicle is).

In general, as shown in step 340 of FIG. 3, the verifiable information is combined to produce a trust score that, in step 350, is compared to a threshold. If the score exceeds the threshold (for a positive threshold) (or is less than the threshold for a negative threshold), the system indicates in step 360 that there is a consensus as to the vehicle's location, and the consensus (and optionally the underlying data used to achieve the consensus) are written to at least one distributed blockchain ledger that corresponds to communications between contract participants only (or onto at least one distributed blockchain ledger that is publicly accessible but for which the data is encrypted in a manner in which only contract participants can unencrypt the data). If a comparison of the score and the threshold indicates that there is not a consensus, then the system passes control to step 330 to record and/or indicate that there is no consensus.

The above scoring is performed using what can be referred to as "instantaneous scoring"—that is, scoring based on sensor readings corresponding to a single, particular trigger signal. The instantaneous scoring does not take into consideration the use of previous trust scores and/or consensus information. Alternatively, the system 100 can utilize a "delayed score" which performs scoring based on sensor readings in combination with a positive or negative previous consensus determination and/or trust score. For example, if the system had 15 and 30 minutes previously determined that there was a consensus as to the tracked vehicle's location, but a current trigger signal was inconclusive (e.g., 50% of the sensors corroborated the location but the threshold was 60%), then a delayed score could be used which could include a decaying factor (e.g., 10% $^\wedge(t_i/15)$) for the last three times ($t_i$) that a consensus value indicated a corroborated location. So, if an instantaneous score was 50% and there were corroborated locations 15 and 30 minutes ago (but not 45 minutes ago), the delayed score would be, in an exemplary embodiment:

$$50\% + (10\%)^{(15/15)} + (10\%)^{(30/15)} = 50\% + 10\% + 1\% = 61\%.$$

Such a delayed score would cause there to be a corroborated location when the threshold is 60%.

As described above, a number of data sources can be used to corroborate carrier-facing status changes that are relevant to whether a carrier/driver is entitled to payment for detention. For example, if a contract guarantees a carrier/truck driver that it can pick-up or unload at a particular warehouse location within a fixed period of time of a specified time window (e.g., loading will occur within 45 minutes at loading bay 1 if the truck arrives within a specified 2 hour time window (such as 9 am-11 am)), then the carrier/truck driver would have a claim for detention if it arrived at 9 am at loading bay 1 but loading bay 1 was occupied until noon. (The carrier/truck driver also would have a claim for detention if the truck arrived between 9 and 11 and the loading dock was available but loading took 3 hours due to a loading dock asset or personnel not being available.) The system 100 could be used to corroborate the existence and length of the delay (e.g., using video from the warehouse gate and/or loading docks, GPS and video from the waiting truck, GPS and video from the truck occupying the agreed upon loading dock, and video and GPS from trucks driving past the waiting and/or unloading trucks). Given that the system 100 corroborates the existence of a delay, disagreements about detention payments can be reduced.

Indeed, the system 100 can be integrated into a smart contract system that uses the corroborated information to automatically handle payments not only for corroborated delivery but also for corroborated detention. For example, the smart contract would include the warehouse delivery parameters agreed upon by the parties (e.g., loading will occur within 45 minutes at loading bay 1 if the truck arrives 9 am-11 am), and then all pertinent corroborated information (e.g., the actual load start time, the actual load completion time, and any carrier-facing status updates including the indication of one or more detention problems). The system 100 therefore can automatically handle adjustments to the contract pricing according to the detention information.

As shown in FIG. 1, given that the system 100 receives events (either in event-form or by reading from accessible blockchains) from contract participants (e.g., from carriers/drivers and transportation depots), the system 100 not only can handle detention payments, it can help carriers/drivers and transportation depots detect conditions that will affect a carrier delivery schedule (involving either pick up or delivery at a loading area of a transportation depot) that will likely result in detention. Preferably, the system further provides rescheduling options to avoid the delay. For example, in a configuration where a driver's schedule is available to the system (as a series of events or as one or more entries on an accessible blockchain) and the transportation depot's relevant information is available to the system (as a series of events or as one or more entries on an accessible blockchain), the system 100 can, in response to transportation depot-side trigger signals and carrier-side trigger signals, perform event mapping/analysis to determine what changes, if any, would avoid or reduce detention issues. In one such analysis, the system 100, in response to at least one transportation depot-side trigger signal, may determine that a transportation depot-side change is required by reading from at least one of the transportation depot's blockchains (e.g., which may also store shipment ready status, warehouse staff availability, and warehouse staff schedules in one or more decentralized ledgers) and detecting that an issue has occurred (e.g., there is insufficient personnel or assets) at a particular loading bay (e.g., loading bay 1) and that the loading bay will not be available to meet its next contracted pickup, but that the warehouse could handle in a two-hour window the next contracted pickup if it arrived an hour later. The system 100 therefore attempts to find an alternate schedule that will accommodate all existing deliveries/pick ups or at least a schedule that has the smallest effect on existing deliveries/pick ups. (Exemplary transportation depot-side trigger signals can include, but are not limited to, signals indicating a personnel change, an asset change, a loading area change, and a staging area change, each of which can include additional details (or subcodes) as to what the change is and optionally how long the change is going to last.)

As part of the analysis, the system 100 reads the schedule (e.g., stored on a blockchain accessible by the system 100 but not by competitors) of the driver whose delivery is now going to be late and, for example, determines that the pick up is the driver's first activity of the day. Accordingly, the driver could therefore sleep an extra hour before picking up the delivery. The system 100 can contact the driver (e.g., by text message or using a driver messaging application) to see if this change is acceptable. (There may be an incentive to the driver that is less than the corresponding detention amount.) If the change is acceptable, the system 100 informs the warehouse of the possibility for the change, and the warehouse can accept the modification to be written (along with the driver's agreement to the conditions of the change) onto a blockchain so that it can be processed as part of the contract and/or smart contract. However, in order to accommodate the change, a series of other cascading changes may be needed (either on the transportation depot side or with other carriers). For example, the staging area for the delivery being rescheduled may have to be loaded at a different time than originally scheduled because an asset (e.g., forklift) needed to handle the new time would be unavailable at the newly rescheduled time. Similarly, the personnel being assigned to handle the delivery being rescheduled may have to be changed to accommodate required breaks and/or skill sets.

Alternatively, the system 100 may determine, in response to a carrier-side trigger signal, that a carrier-side change is required by reading from at least one of (a) the consensus blockchain described above (which could indicate that a truck is too far away to meet its scheduled time) and (b) the carrier's blockchains (e.g., which may store a maintenance record indicating that a truck scheduled to make a pickup at a warehouse at a particular time has had a flat tire or has over-heated). The system 100 therefore attempts to find an alternate schedule to accommodate the change. In the case of a pickup where the load to be picked up has not yet been moved to its staging location, the system may determine an alternate location to stage the pickup to that corresponds to a loading bay that will be available at the new pickup time (and potentially a cost for doing so, such as overtime for the personnel to move the goods later). In the case of a pickup where the load to be picked up has already been moved to its staging location but the transportation depot has sufficient assets and idle personnel (or personnel that can be contracted to accommodate the change), the system 100 can provide the transportation depot with a schedule change to have the available people use the available assets to move the staged goods as necessary (and indicate a projected cost of doing so).

As would be appreciated by those of skill in the art, the system 100 can attempt to make cascading changes in delivery/pick up schedules in order to accommodate real-time changes (e.g., moving staged goods out of one area and freeing up an asset (e.g., a forklift) for later can allow another delivery to be moved up if it fits a driver's schedule because the driver was otherwise going to be eating). By having access to both carrier-side and transportation depot-side information, the system 100 can provide rescheduling better than either side alone.

While a portion of the above discussion has focused on the system 100 providing changes to scheduling for carriers and transportation depots in light of problems that have arisen in previously scheduled deliveries/pick ups, the system 100 likewise can be configured to perform the initial scheduling based on blockchains storing the same kind of information initially that are stored for real-time rescheduling. For example, based on personnel schedules (warehouse-side), assets required for shipments (warehouse-side), loading area availability (warehouse-side), driver hours and schedules (carrier-side), the system 100 can match carrier capacity to warehouse availability and assign delivery/pick-up schedules automatically.

As described herein, at least one multi-party ledger-based blockchain system can be utilized by the system 100 for storing and managing, for example, smart contracts and consensus information about on-going deliveries. However, the system 100 need not utilize a single multi-party ledger-based blockchain system for all information stored and managed within the system 100. Instead, the system may utilize plural multi-party ledger-based blockchain systems to separately store and manage various phases of shipping contract management. For example, the system may utilize: (1) an RFP (Request for Proposals) and Bid Ledger, (2) a Contract Ledger, and (3) a Freight Ledger to store and manage their respective portions of the information related to the shipping contracts of the system.

An RFP is often used by shippers to secure capacity for their forecasted demand. For many shippers, carrier selection is central to their transportation process as it allows them to identify the appropriate carriers matching the requirements by shipping lanes. Shippers spend a significant amount of time vetting carriers to ensure the chosen ones offer the needed services (e.g., at acceptable cost and service levels). On the other hand, carriers invest a lot of effort in analyzing their freight network to determine competitive rates. As shippers and carriers exchange key information in a shared common blockchain network, it is very critical to safeguard the data. One embodiment for securing the data in the network is to encrypt the data using the participants' keys so that only the communicating parties can decrypt the data and retrieve the information in unencrypted form. (While other participants may be able to read the encrypted packets on the blockchain that make up the information, they cannot decrypt the information stored therein.)

In one such embodiment, when a shipper sends an RFP to a list of pre-selected carriers, the system 100 will create a separately encrypted record for each carrier (e.g., using a symmetric key shared between the shipper and the respective carrier or using public key cryptography techniques where the shipper and each of the carriers have associated public and private keys). Each record for each respective carrier may additionally include a unique ID for identifying the RFP. In addition, using such a ledger-based system with encryption provides record provenance between shipper and carriers, and enables reliable logging of all communications between the parties during negotiation.

When the shipper awards a lane(s) to a carrier, the award is stored on the RFP and Bid Ledger (so that the result of the RFP can be tracked). The award preferably also is stored on the Contract Ledger. As a result, a user attempting to determine awarded existing contract parameters can start with finalized contracts on the Contract Ledger rather than potentially having to review numerous entries on the RFP and Bid Ledger.

The Contract Ledger also can be used as a tool to ensure that freight loads are being priced according to the terms of awarded contracts (and in the quantities agreed to by the awarded contracts). Historically, shippers assemble a group of analysts to determine a multi-month (e.g., 6-month) sales forecast for the logistics team to build an RFP. When the RFP is sent to a list of pre-selected carriers, the transportation team on the other side identifies mileage rates for each lane in the RFP based on the transportation network. This information is then passed back to the shippers for them to identify the right carriers depending on cost and service capabilities. However, historically there has not been a validation mechanism to ensure the negotiated rates and terms are enforced in the daily transactions by automatically connecting new loads to awarded contracts. Instead, historically the contracts and daily transactions are handled individually, and since the freight contract is historically a legal paper document that is kept in a file cabinet, the contract is not cross-checked to ensure compliance. As a result, it takes a long time for carriers to get paid because the financial analysts often do not have adequate information to submit and approve invoices.

According to one implementation of a system 100, automated payment processing can be handled by the system 100. When shippers award lanes to carries, they will also add funds to one or more of (1) an escrow account (managed in a blockchain) on a daily or weekly basis, or when live loads flow into system 100 or (2) a bank account used to handle shipments for the awarded lane. Then, when carriers submit an invoice with delivery complete information (such a proof-of-delivery), the system will verify the information using the consensus mechanism (and other ledger-based systems as described herein) to release funds to the carrier. Historically. a carrier has had to wait anywhere between a day and 21 days to get paid. Although shippers have all the necessary details to authorize payment, often they tend to (unnecessarily) delay the payments. Today, carriers are turning to financing companies to get advances on payments, but at a cost of a 3 to 18% commission/penalty. Instead, using the system 100, when all criteria are met, a smart contract can be used to validate the documents and release payments from the escrow or transfer funds from the bank account, thereby accelerating payments. In one embodiment, a shipper gets a share back for faster settlements (X % of the load revenue) under the terms of the bid/smart contract.

Using the system 100, the RFP and freight load information can be cross-checked at the time that a live load is being accepted by the system—thereby identifying and resolving any inconsistencies earlier in the shipping process. For example, when shippers transmit live load information (e.g., using EDI 204), the system can cross check the data against the corresponding contract to ensure the load is complaint with the bid (e.g., ships to/from valid zip codes, is complaint with all weight, volume, and quantity restrictions, is not valued at a rate higher than the maximum insured rate, is using the agreed upon shipping rates/special charges). It can also ensure that the load now being added does not exceed the maximum number of loads (e.g., per week or month) that the shipper is allowed to send by reading the number of corresponding loads on the Contracts Ledger and/or the Freight Ledger. This resolves the problem upstream rather than letting the problem to occur and spending a large amount of rectifying it. In one such embodiment, the system processes live load information by: (1) receiving from a shipper live load information for a specified carrier; (2) locating a corresponding bid for the load; (3) validating the data in the load against the bid; (4) warning the sender of any conflicts found while validating; and (5) creating, if the new load is compliant with the bid, a record for the new load for the designated carrier in the Freight (Blockchain) Ledger to be used with tracking of the load, as described herein.

In an alternate embodiment, shippers may utilize a shipper-side application that provides a user-interface for checking that the information about a live load to be submitted to the system matches the parameters of an RFP before allowing the live load to be submitted to the system 100. In yet another embodiment, shippers may utilize a live load entry system that automatically avoids inconsistencies by flagging the data during data entry. For example, if a shipper identifies a source or destination zip code not covered by the contract awarded based on an RFP, then the live load entry system will not allow the inconsistent shipping information to be entered. Similarly, if the weight, quantity, volume, value, or rate (including special charges) entered for the shipment indicated that the delivery was inconsistent with the terms of the contract, then the entries could be flagged before being sent to the system 100. Similarly, one or more applications with access to the ledger(s) discussed herein can be used to cross-check invoices carriers submit to the shippers. Once the shipment is delivered, the driver uploads one or more proof-of-delivery (POD) documents confirming the delivery through an onboard computer system or a mobile device. The POD document(s) is/are then stored in the TMS (Transportation Management System) which is then used by the accounting team to submit invoices. Historically, as the accounting person may not have access to the agreed rates in the bid (or may fail to cross-check the agreed rates), the accounting team could submit an invoice with incorrect information resulting in delays. Instead, utilizing the information stored in the ledger(s) described herein, an application accessing the ledger(s) can compare the rates in the invoice with rates in Bid file to ensure they match. If not, the application notifies the accounting team of the inconsistency. In addition, the system 100 provides the shipper all relevant information in one place for validation (e.g., on a blockchain ledger), thereby reducing settlement times associated with the cross-checked invoice. Alternatively, for invoices submitted for processing (along with consensus-based proof-of-delivery information) in which the bid and/or accepted contract under which the shipment was shipped are available electronically on a blockchain-based ledger system, an accounting team need not even be used as the payment process can be handled automatically through a smart contract.

In one embodiment of the present invention, the system 100 utilizes at least one computer processor coupled to at least one computer memory (e.g., RAM, SRAM, or FRAM), wherein the at least one computer processor executes a set of computer instructions stored in the at least one computer memory to perform the functions described herein. A number of different computer languages and styles of computer languages can be used to implement the functions described herein, such as interpretive and compiled languages. Indeed, a number of languages (e.g., Python) that can be used to write the code to implement the functions described herein can be both interpreted and compiled. Similarly, the functions described herein can be implemented as part of a state machine in circuitry (e.g., FPGAs, ASICs, SOCs, and processor/memory). In each of those implementations, the circuitry preferably includes at least one communications interface for interfacing with the sources of data described herein and for reading from and/or writing to the distributed, multi-party ledgers described herein. Various input and output devices such as displays, printers, microphones and keyboards may be used with the system 100.

While certain configurations or structures have been illustrated for the purposes of presenting the basic structures of the present invention, one of ordinary skill in the art will appreciate that other variations are possible which would still fall within the scope of the appended claims.

The invention claimed is:

1. A computer implemented method to perform verifiable modifications of delivery schedules for carriers, comprising, by one or more computing devices:
   determining, in response to receiving a depot-side trigger communication from a transportation depot computing system indicating a change affecting a delivery of a carrier involving at least one delivery area of the transportation depot, a change in a delivery schedule of the carrier that would reduce detention of the carrier;
   communicating, to a carrier computing device associated with the carrier, the change in the delivery schedule;
   receiving, from the carrier computing device, an indication of whether the carrier has accepted the change in the delivery schedule;
   storing, on a blockchain shared between the transportation depot computing system and the carrier computing device, the change in the delivery schedule when the carrier has accepted the change in the delivery schedule;
   receiving, from the carrier computing device, a carrier-side communication including a detention status of the carrier at the transportation depot;
   determining a location associated with the carrier-side communication indicating the detention status, wherein determining the location includes:
      accessing an event stream that includes location data that corresponds to the location associated with the carrier-side communication, the location data including a cryptographic hash including a hidden random number and a time varying value generated by a global positioning system (GPS) unit of the carrier computing device; and
      verifying the cryptographically hashed location data using the hidden random number;
   retrieving, from one or more third party computing devices, one or more corroborating information associated with the location that corroborate the detention status of the carrier;
   determining a confidence score for the detention status based on a number of retrieved third-third party corroborating information that corroborates the detention status;
   when the confidence score is above a threshold amount:
      determining, from the one or more third party corroborating information, a length associated with the detention status; and
      storing, on the blockchain, detention status information including the detention status of the carrier, the length associated with the detention status, and at least part of the one or more corroborating information to generate an updated blockchain; and
   modifying a value of a smart contract accessible to the transportation depot computing system and the carrier computing device based on the detention status information stored on the updated blockchain.

2. The method of claim 1, wherein the depot-side trigger communication indicates a change in availability of at least one of transportation depot personnel, transportation depot assets, and a transportation depot loading area.

3. The method of claim 2, wherein the depot-side trigger communication indicates a change in availability of at least one of a fork lift and a crane.

4. The method of claim 1, wherein the depot-side trigger communication indicates a delay in at least one of loading and unloading of a vehicle using the at least one delivery area of the transportation depot before the carrier is scheduled to use the at least one delivery area of the transportation depot.

5. The method of claim 1, wherein communicating, to the carrier computing device, the changes in the delivery schedule of the carrier comprises communicating an incentive to the carrier computing device for accepting the change in the carrier delivery schedule.

6. The method of claim 1, wherein determining, in response to receiving the depot-side trigger communication, the change in the delivery schedule comprises determining a series of cascading changes, including the change in the delivery schedule, that would reduce detention of the carrier.

7. The method of claim 6, wherein the series of cascading changes comprises, in addition to the change in the carrier delivery schedule, at least one depot-side change.

8. The method of claim 7, wherein the at least one depot-side change comprises a change in assignment for a transportation depot asset.

9. The method of claim 7, wherein the at least one depot-side change comprises a change in transportation depot personnel.

10. The method of claim 1, further comprising, by the one or more computing devices:
    receiving a carrier-side trigger communication indicating a change affecting a delivery schedule for a delivery of another carrier involving the at least one delivery area of the transportation depot;
    reallocating at least one of a transportation depot-side asset and transportation depot-side personnel to accommodate the change affecting the delivery schedule for the delivery of the another carrier; and
    storing, on a blockchain of the transportation depot computing system, an indication of the reallocation of the at least one of a transportation depot-side asset and transportation depot-side personnel to accommodate the change affecting the delivery schedule for the delivery of the another carrier.

11. The method of claim 1, further comprising, by the one or more computing devices:
    receiving, from the carrier computing device, an indication that the carrier has not accepted the change in the carrier delivery schedule; and
    storing, on the blockchain shared between the transportation depot computing system and the carrier computing device, an amount of a detention payment for which the transportation depot is liable.

12. The method of claim 11, further comprising, by the one or more computing devices:
    executing a payment to the carrier for the corroborated detention status under corroborated terms of the smart contract.

13. The method of claim 1, further comprising: storing, on the blockchain, corroboration information corroborating the length associated with the detention status.

14. The method of claim 1, wherein at least one of the one or more corroboration information comprises at least one video image taken at the transportation depot.

15. A system for modifying delivery schedules of carriers, comprising:
a non-transitory computer-readable storage medium;
a computer processor coupled to the computer-readable storage medium, wherein the computer processor is configured to execute computer-readable instructions stored thereon, that when executed cause the system to:
in response to receiving a depot-side trigger communication from a transportation depot computing system associated with a transportation depot indicating a change affecting a delivery of a carrier involving at least one delivery area of the transportation depot, determine a change in a delivery schedule of the carrier that would reduce detention of the carrier;
communicate, to a carrier computing device associated with the carrier, the change in the delivery schedule;
receive, from the carrier computing device, an indication of whether the carrier has accepted the change in the delivery schedule;
store, on a blockchain shared between the transportation depot computing system and the carrier computing device, the change in the delivery schedule when the carrier has accepted the change in the delivery schedule;
receive, from the carrier computing device, a carrier-side communication indicating a detention status of the carrier at the transportation depot;
determine a location associated with the carrier-side communication indicating the detention status, wherein determining the location includes:
accessing an event stream that includes location data that corresponds to the location associated with the carrier-side communication, the location data including a cryptographic hash including a hidden random number and a time varying value generated by a global positioning system (GPS) unit of the carrier computing device; and
verifying the cryptographically hashed location data using the hidden random number;
retrieve, from one or more third party computing devices, one or more corroborating information associated with the location that corroborate the detention status of the carrier;
determine a confidence score for the detention status based on a number of retrieved third-third party corroborating information that corroborates the detention status;
when the confidence score is above a threshold amount:
determine, from the one or more third party corroborating information, a length associated with the detention status; and
storing, on the blockchain, detention status information including the detention status of the carrier, at least part of the one or more corroborating information, and the length associated with the detention status to generate an updated blockchain; and
modify a value of a smart contract accessible to the transportation depot computing system and the carrier computing device based on the detention status information stored on the updated blockchain.

16. The system of claim 15, wherein the computer processor is further configured to execute computer-readable instructions stored thereon, that when executed further cause the system to:
receive a carrier-side trigger communication indicating a change affecting a delivery schedule for a delivery of another carrier involving the at least one delivery area of the transportation depot;
reallocate at least one of a transportation depot-side asset and transportation depot-side personnel to accommodate the change affecting the delivery schedule for the delivery of the another carrier; and
store, on a blockchain of the transportation depot computing system, an indication of the reallocation of the at least one of a transportation depot-side asset and transportation depot-side personnel to accommodate the change affecting the delivery schedule for the delivery of the another carrier.

17. The system of claim 15, wherein the computer processor is further configured to execute computer-readable instructions stored thereon, that when executed further cause the system to:
receive, from the carrier computing device, an indication that the carrier has not accepted the change in the carrier delivery schedule; and
store, on the blockchain shared between the transportation depot computing system and the carrier computing device, an amount of a detention payment for which the transportation depot is liable.

18. The system of claim 15, wherein the computer processor is further configured to execute computer-readable instructions stored thereon, that when executed further cause the system to:
receive, from the carrier computing device, an indication that the carrier has not accepted the change in the carrier delivery schedule; and
store, on the blockchain shared between the transportation depot computing system and the carrier computing device, an amount of a detention payment for which the transportation depot is liable.

19. A non-transitory computer-readable storage medium comprising computer-readable instructions that, when executed by a processor, cause the processor to perform operations comprising:
in response to receiving a depot-side trigger communication from a transportation depot computing system indicating a change affecting a delivery of a carrier involving at least one delivery area of the transportation depot, determining a change in a delivery schedule of the carrier that would reduce detention of the carrier;
communicating, to a carrier computing device associated with the carrier, the change in the delivery schedule;
receiving, from the carrier computing device, an indication of whether the carrier has accepted the change in the delivery schedule;
storing, on a blockchain shared between the transportation depot computing system and the carrier computing device, the change in the delivery schedule when the carrier has accepted the change in the delivery schedule;
receiving, from the carrier computing device, a carrier-side communication indicating a detention status of the carrier at the transportation depot;
determining a location associated with the carrier-side communication indicating the detention status, wherein determining the location includes:
accessing an event stream that includes location data that corresponds to the location associated with the carrier-side communication, the location data including a cryptographic hash including a hidden random number and a time varying value generated by a global positioning system (GPS) unit of the carrier computing device; and verifying the cryptographically hashed location data using the hidden random number;

retrieving, from one or more third party computing devices, one or more corroborating information associated with the location that corroborate the detention status of the carrier;

determining a confidence score for the detention status based on a number of retrieved third-third party corroborating information that corroborates the detention status;

when the confidence score is above a threshold amount:
  determine, from the one or more third party corroborating information, a length associated with the detention status; and
  storing, on the blockchain, detention status information including the detention status of the carrier, at least part of the one or more corroborating information, and the length associated with the detention status to generate an updated blockchain; and modify a value of a smart contract accessible to the transportation depot computing system and the carrier computing device based on the detention status information stored on the updated blockchain.

20. The non-transitory computer-readable medium of claim 19, further comprising computer-readable instructions that, when executed by a processor, cause the processor to perform operations comprising:

receive a carrier-side trigger communication indicating a change affecting a delivery schedule for a delivery of another carrier involving the at least one delivery area of the transportation depot;

reallocate at least one of a transportation depot-side asset and transportation depot-side personnel to accommodate the change affecting the delivery schedule for the delivery of the another carrier; and store, on a blockchain of the transportation depot computing system, an indication of the reallocation of the at least one of a transportation depot-side asset and transportation depot-side personnel to accommodate the change affecting the delivery schedule for the delivery of the another carrier.

* * * * *